United States Patent [19]
Dillon

[11] Patent Number: 6,125,618
[45] Date of Patent: Oct. 3, 2000

[54] ARTICULATED COMBINE

[76] Inventor: Ben N. Dillon, 206 Greensprings Dr., Columbus, Ohio 43235

[21] Appl. No.: 09/481,046

[22] Filed: Jan. 11, 2000

Related U.S. Application Data

[62] Division of application No. 09/040,985, Mar. 18, 1998, Pat. No. 6,012,272.

[51] Int. Cl.[7] .................................................. A01D 34/00
[52] U.S. Cl. ............................................ 56/14.6; 460/114
[58] Field of Search ..................................... 56/14.6, 16.6, 56/208, 13.5; 460/23, 116, 119, 114; 180/14.1, 14.2, 253, 308; 280/442, 443, 419, 426

[56] References Cited

U.S. PATENT DOCUMENTS

| | | | |
|---|---|---|---|
| 3,865,208 | 2/1975 | Crawshay et al. | 180/6.48 |
| 4,317,326 | 3/1982 | Riedinger | 56/14.6 |
| 4,414,794 | 11/1983 | Riedinger | 56/16.6 |
| 4,428,182 | 1/1984 | Allen et al. | 56/14.6 |
| 4,453,614 | 6/1984 | Allen et al. | 180/139 |
| 5,908,081 | 6/1999 | Olson | 180/419 |

*Primary Examiner*—Robert Pezzuto
*Attorney, Agent, or Firm*—Mueller and Smith, LPA

[57] ABSTRACT

Broadly, one aspect of the present invention is an articulated combine having increased on-board grain storage capacity (e.g., 1,200 bushels) and which is composed of a forward unit having an operator's cab, an engine, a grain harvesting assembly, a grain transfer assembly, and being devoid of an on-board grain bin; and a rearward unit jointedly attached to the forward section and having, steerable and powered wheels, an on-board grain bin for receiving grain from the forward section grain transfer assembly, and a grain off-loading assembly. The grain transfer assembly, joint, and grain off-loading assembly and controls, form other aspects of the present invention.

5 Claims, 11 Drawing Sheets

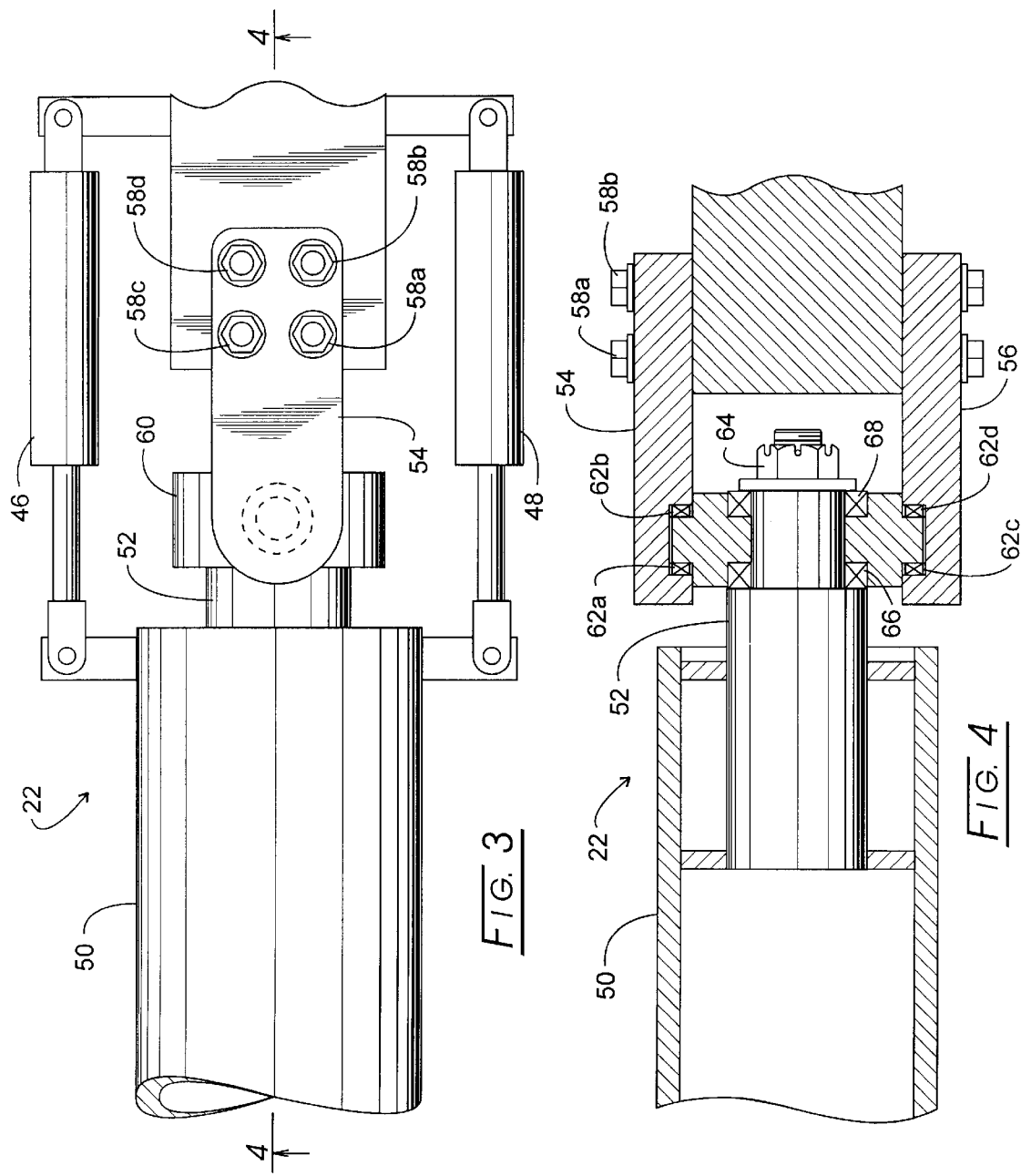

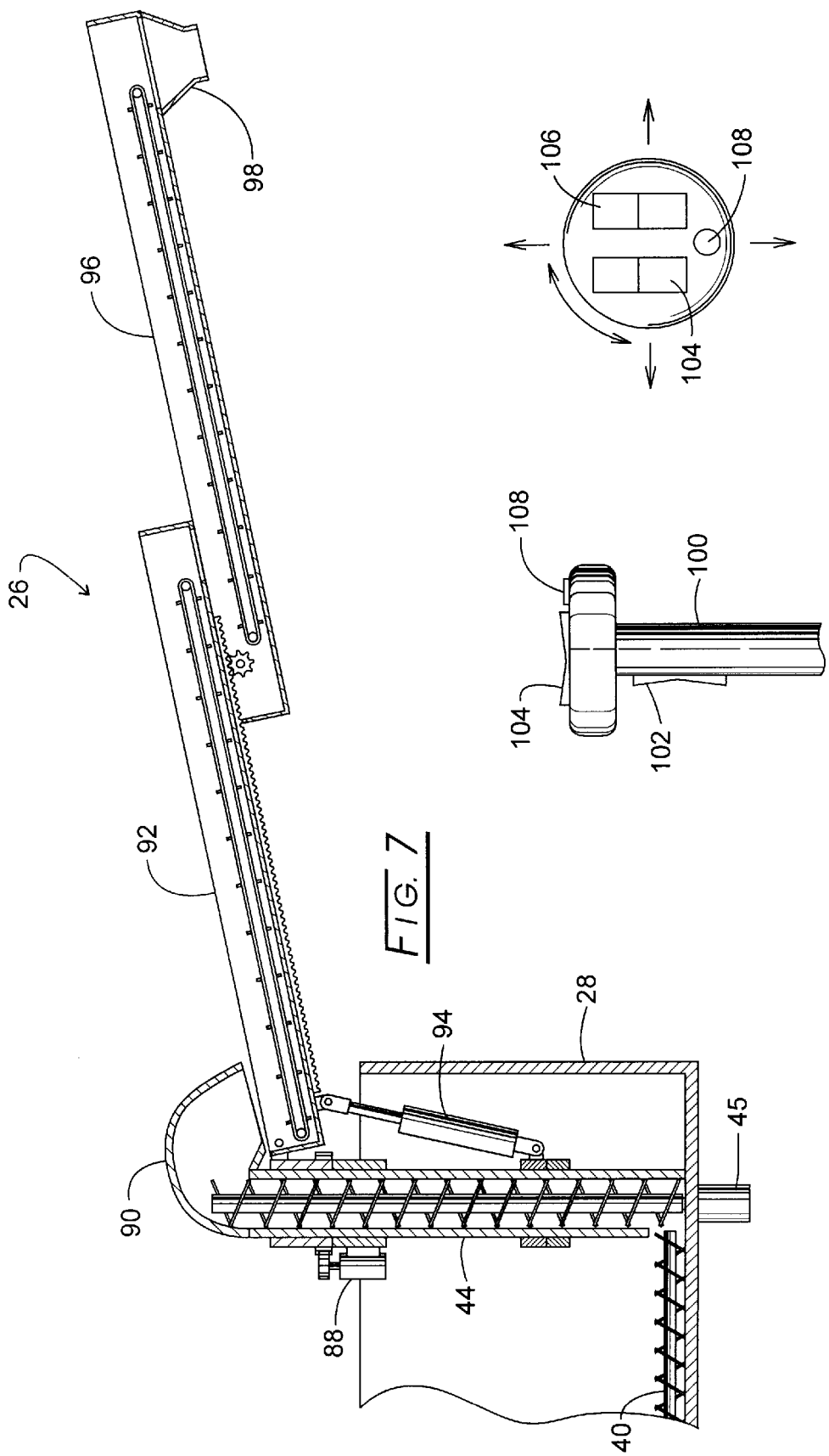

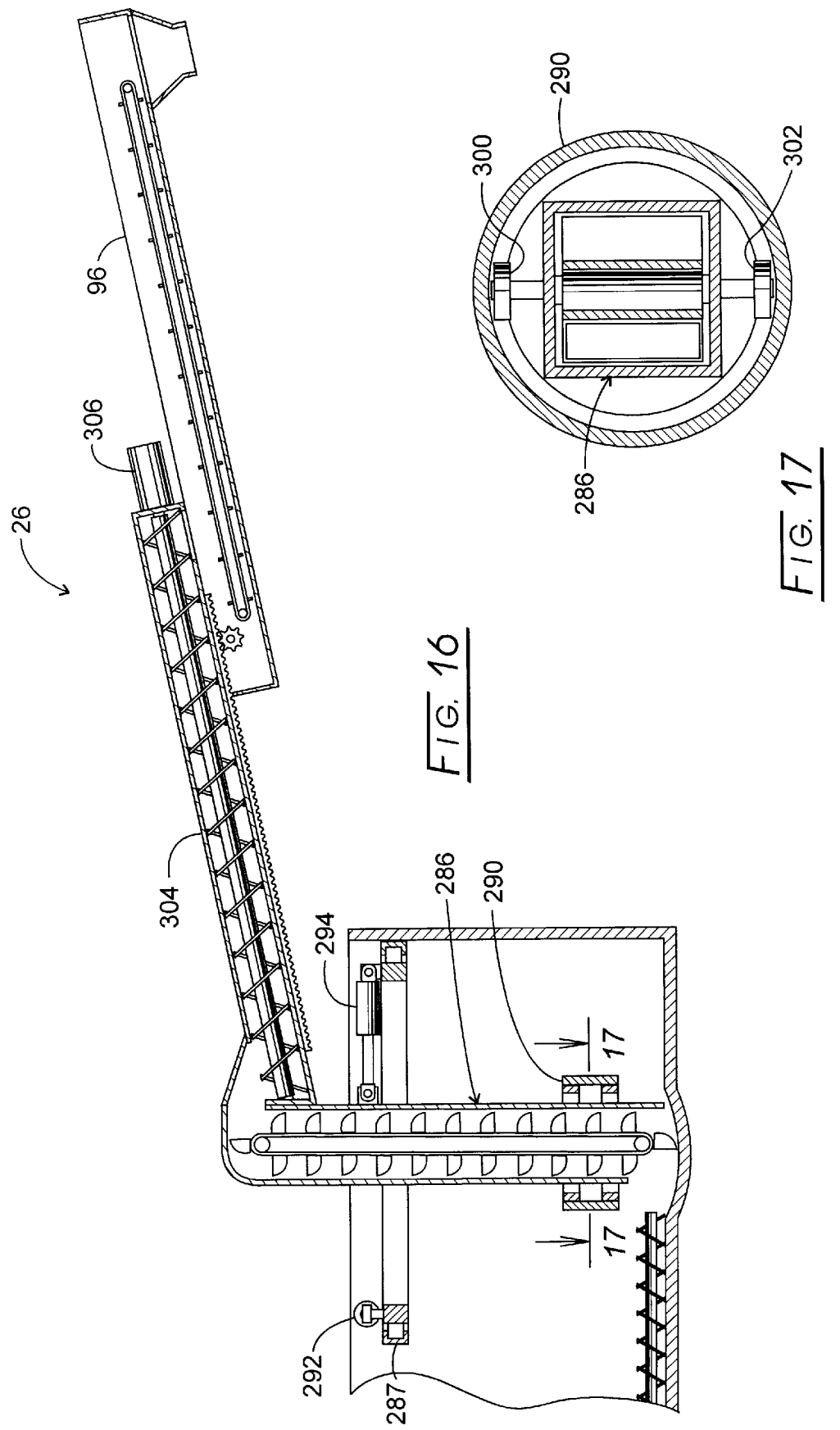

ARTICULATED COMBINE

CROSS-REFERENCE TO RELATED APPLICATIONS

This application is a divisional application of U.S. Ser. No. 09/040,985, filed Mar. 18, 1998, now U.S. Pat. No. 6,012,272; the disclosure of which is expressly incorporated herein by reference.

This application is cross-referenced to application Ser. No. 08/927,872 filed Sep. 11, 1997, the disclosure of which is expressly incorporated herein by reference.

BACKGROUND OF THE INVENTION

The present invention generally relates to combines and more particularly to an articulated (jointed) combine which employs, inter alia, an improved joint, unloading capability and control, steering, and extremely large grain storage capacity.

A modern agricultural combine typically unloads or transfers clean grain from its on-board storage hopper utilizing an auger of fixed length which swings out in a fixed radius and fixed elevation arc from its stowed position. The stowed position generally is pointing to the rear of the combine. The auger in turn generally is driven by a mechanical arrangement of belts, chains, clutch, and gearbox. The unload auger in most combine designs swings out to the operator's left. The auger length generally is limited by the practical distance that it can extend beyond the rear of the combine in its stowed position without creating a serious maneuvering hazard.

As the size of on-board storage hoppers and capacity of combines has increased, the time required to maneuver the machine next to the grain receiving wagon or truck and the grain transfer time have become a major component of the total harvesting time. Conventional combines have a grain hopper capacity of 250 to 300 bushels and unload auger capacities of 1.9 to 2.6 bushels per second.

The unload time of the hopper typically is about 2 to 3 minutes with the unload auger running at maximum speed and 1 to 2 minutes are taken to maneuver the combine into the optimum unload position next to the truck or wagon. Re-positioning the combine and running the auger at less than maximum speed are often encountered when topping off the truck or wagon which is receiving the grain. As modem combine harvesting capacities approach 3,000 bushes per hour, the unload cycle must be repeated every 8 to 10 minutes. Therefore, the total unload time or non-harvesting time is a significant reduction of total grain harvesting productivity.

This productivity loss can be countered by a second operator utilizing a tractor and grain cart following the combine back and forth through the field to unload the on-board combine storage hopper without stopping the harvesting process. Alternatively, a combine with an integrated grain cart, as disclosed in application Ser. No. 08/927872, cited above, can be utilized to reduce the number of unload cycles and at least double the rate at which grain is discharged to the receiving vehicle.

Unloading combines into semi-trailer road trucks has become the prevalent practice as opposed to field wagons which were utilized in the past. These road trucks typically are parked at the side of the road and not in the field where the combine is operating. This necessary practice almost always creates an elevational difference between the two vehicles. These road trucks themselves also have widely varying heights. These two conditions create a big variation in the optimum elevation of the discharge point of the combine unloading system. Combine manufacturers have attempted to address this problem with ever longer augers and higher fixed swing out arcs. There are, however, limits to both. This fixed point discharge point frequently ends up too high, too low, too far from the combine, or too close to the combine for optimum truck loading conditions. Such conditions require repositioning the while combine with respect to the vehicle it is loading.

Existing combine unloading systems can unload from one side of the machine only. This frequently requires 180° turns by the combine to position it on the proper side to unload the grain into the road truck. It also means that the combine can be unloaded into a moving grain cart when traveling only in one direction through the field since access to one side of the combine is virtually always blocked by unharvested crop.

When topping off or completely filling the truck or wagon, it is necessary for the operator to inch the combine forward or backward during the process. In addition to being cumbersome, the combine must be positioned close to perfectly parallel to the receiving vehicle or a stop and reposition is necessary. The lack of parallelism frequently cannot be solved by moving the auger through its fixed arc.

An agricultural combine has multiple steering requirements. Precise control is needed as the row harvesting units such as a cornhead, are guided through the rows of grain. When the end of the field is reached, a tight turning radius is needed to proceed back across the field in order to harvest the crop immediately adjacent to the just-completed rows or round. Concomitant with its field performance, this large vehicle also must be controlled on the roadway at speeds of around 20 mph and around tight corners. Another steering associated problem is to turn multiple axle, heavily-loaded bogies with large tires in a tight radius while minimizing sliding the tires in the horizontal direction which places high stresses in the suspension, piles up dirt in the field, and causes excessive tire wear.

An early attempt at an articulated combine is reported in U.S. Pat. No. 4,317,326. The design capacity is stated to be around 360 bushels. Its unloading mechanism is limited to one side of the combine and steering is accomplished only by articulation steering cylinders. To date, no articulated combine is commercial. Clearly, there is a need for a more flexible, faster, and convenient combine which overcomes these and other problems such as those set forth above.

BRIEF SUMMARY OF THE INVENTION

The present invention is addressed to solving the problems detailed above by providing an articulated pointed) combine which employs, inter alia, an improved joint, unloading capability and control, transfer of grain from a forward unit to a grain bin on a rearward unit, and extremely large grain storage capacity. Broadly, then, one aspect of the present invention is a combine, preferably articulated, having increased on-board grain storage capacity and which is composed of a forward unit having an operator's cab, an engine, a grain harvesting assembly, a grain transfer assembly, and being devoid of an on-board grain bin; and a rearward unit jointedly attached to the forward section and having, steerable and powered wheels, an on-board grain bin for receiving grain from the forward section grain transfer assembly, and a grain off-loading assembly.

Another aspect of the present invention is directed to a joint for a powered articulated vehicle, such as a combine for joining a forward unit to a rearward unit. The joint includes an upper frame member carried by the forward unit and having a recess on its lower side and a lower frame member carried by the forward unit, having a recess on its upper side, and being spaced-apart vertically below the upper frame member so that the recesses are in vertical registration. The joint further includes a shaft carried by the rearward unit and a bearing retainer assembly carried by the end of the shaft and disposed between the recesses. The bearing assembly includes an outer annulus surmounting an inner hub which hub is connected to the shaft with thrust bearings inserted between the annulus and said hub, whereby the inner hub co-rotates with shaft with respect to the outer annulus. The bearing assembly also includes a pair of nibs carried by the outer annulus which nibs reside in the upper and lower recesses and which nibs are associated with tapered roller bearings so that the outer annulus co-twists with the shaft respect to the forward unit. Uniquely, the joint is stiff in the longitudinal axis formed along the forward unit frame members and the rear unit shaft A further aspect of the present invention is an improved articulated combine of a forward unit and rearward unit which connected by a joint wherein the improvement is directed to transferring clean grain from the forward unit to the rearward unit. Such improved combine is composed of a rearward unit which has a forward and the forward unit has a back, both of which conform in shape to each other and both of which are curved to match the radius of articulation of the combine. The rearward unit forward has a horizontal slot in it. The grain transfer assembly has an elongate discharge end which fits into the rearward unit forward horizontal slot for providing grain transfer capability to the onboard rearward unit grain bin while the forward and rearward units are being turned about the joint interconnecting the forward and rearward units.

Yet another aspect of the present invention is an unload assembly for unloading clean grain from a combine grain bin and which is composed of a telescoping grain movement assembly composed of a proximal grain mover and a distal grain mover. The proximal grain mover is pivotally attached to the grain bin for movement to either side of the grain bin and for movement vertically. The distal grain mover is in telescoping attachment with the proximal grain mover and from which clean grain is discharged from the unload assembly.

Advantages of the present invention include a combine design, preferably an articulated combine, which enables grain storage capacity of between 500 and 1,000 bushels or more. Another advantage is an articulated combine which can unload clean grain to either side and which is controlled by a unique control system. A further advantage is a unique steering system for an articulated combine. These and other advantages will be readily apparent to those skilled in this art.

BRIEF DESCRIPTION OF THE DRAWINGS

For a fuller understanding of the nature and objects of the present invention, reference should be had to the following detailed description taken in connection with the accompanying drawings in which:

FIG. 3 is a sectional view taken along line 3—3 of FIG. 1;

FIG. 4 is a sectional view taken along line 4—4 of FIG. 3;

FIG. 7 is a side-elevational cut-away view of the novel clean grain transfer assembly depicted in FIG. 1;

FIG. 8 is a partial side elevational view of a joystick used to control the clean grain transfer assembly depicted in FIG. 7;

FIG. 9 is a top view of the joystick shown in FIG. 8;

FIG. 16 is a side-elevational cut-away view of the alternative clean grain transfer assembly depicted in FIG. 15; and FIG. 17 is a view along line 17—17 of FIG. 16.

Figure 1:
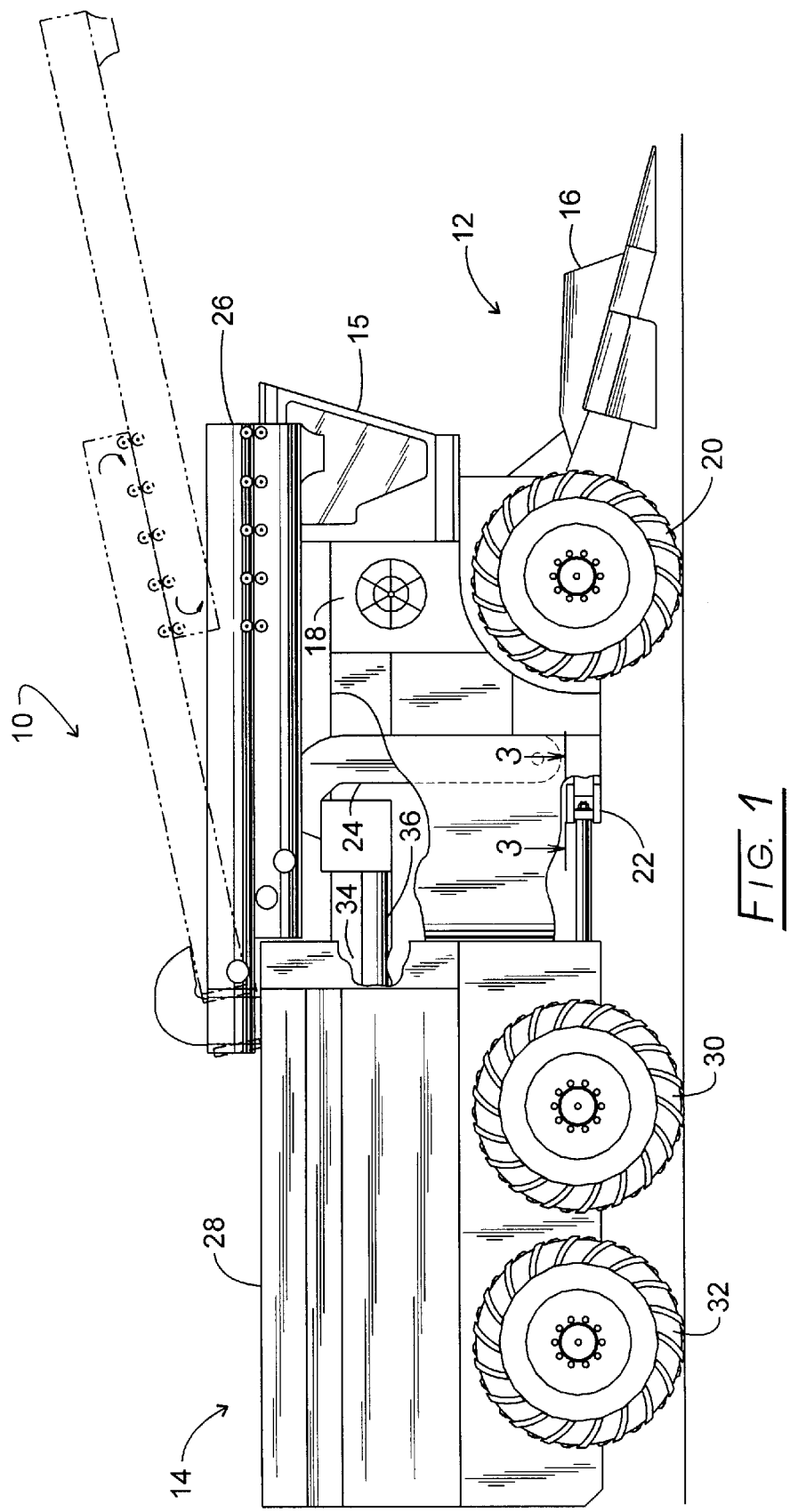
FIG. 1 is a side elevational view of the novel combine (or harvester) with extra large storage capacity, novel joint, clean grain transfer ability, and unloading capacity.

The drawings will be described in detail below.

DETAILED DESCRIPTION OF THE INVENTION

The present invention addresses problems associated with modern farming combines by providing a harvester which can unload readily on either side and to virtually any height road truck. The harvester also increases the harvested grain carrying capacity from about 200–300 bushels in conventional combines to about 500–1,200 bushels utilizing the rearward-only grain bin because the rearward unit has more space than there is over the front axle. This is important because the capacity of a typical road semi-trailer is 1,000 bushels. This means that the novel combine can fill an entire road truck from its on-board grain bin in a single unloading. Moreover, the unique unloading system permits unloading of clean grain from the rearward grain cart on either side of the combine. Such increased grain storage capacity is possible because locating the grain bin on the rearward unit permits a much lower center of gravity to be designed into the rearward unit.

In order to ensure that the extra weight can be easily maneuvered by the novel harvester, the rearward unit has powered and steerable wheels. The typical grain bin located on the forward unit now has been eliminated by dint of the rearward unit on-board storage bin. The forward unit now only needs to have an operator's cab, an engine, a harvesting assembly (including grain cleaning), and a clean grain transfer assembly for transferring clean grain from the forward unit to the rearward cart grain bin. Finally, the forward and rearward units are interconnected by a unique two-axis joint. Chaff from the harvesting assembly is discharged downwardly and to the side of the two-axis joint which needs to be rounded in design so that the chaff does not build up on any horizontal surfaces.

Steering problems associated with heavily-loaded, large tired bogies is inventionally solved by a compound or combination steering system which utilizes steerable wheels on the rearward bogey or unit and conventional steering cylinders at the articulated joint. Compound steering systems have been used in agricultural tractors to provide for both tight turning radiuses and precise row steering. An example of such a system is disclosed in U.S. Pat. No. 4,802,545 which proposes a 4-wheel drive tractor equipped with both an articulation joint and a pivotable front axle in a wagon-wheel configuration. The pivoting front axle is used for precise row steering and articulation is added for tight radius turns.

The present invention utilizes powered and steerable rearward units to support the harvested grain, as first disclosed in application Ser. No. 08/927,872 (cited above). The steerable and powered rear axles also minimize the horizontal sliding problem by providing a coordinated turning radius of multiple axle configurations. The steerable rear wheels are used for relatively small steering corrections and for precise row following while harvesting. The rotation of the rear wheel steering wheels of approximately 15° to 20°, then, is augmented by conventional steering cylinders at the articulation joint to accomplish tight radius turns. Limiting the rear wheel turning in degrees also minimizes their intrusion into space needed to maximize grain carrying capacity.

Although more elaborate control systems may be utilized, the compound steering disclosed herein may be safely implemented using two rather conventional steering valves or a multiple port valve actuated by the operator steering wheel located in the combine cab. When the operator moves the steering wheel a small increment, the first valve or port directs hydraulic fluid to the steering cylinder at the rear axles. If the operator continues turning the steering wheel in the same direction, hydraulic fluid or oil will be directed further to the rear axle steering cylinders until they reach a maximum travel and articulation begins by the valve now directing oil to the articulation cylinders. When the operator calls for the vehicle to return to a straight ahead direction, the articulation cylinders return to their balanced, equal extension, home position. The rear wheel steering cylinders then receive oil flow from the steering valves in the reverse direction to move the rear wheels to their straight ahead home position. At all relevant times, both the rearward unit wheel steering cylinders and the articulation cylinders are held in position by check valves until the steering valve directs oil flow to them which causes the check valves to open. The check valves prevent external forces from causing the combine to drift when the operator is not calling for a change in direction. Alternatively, the operator can override these controls and manually articulate the novel combine.

Figure 2:
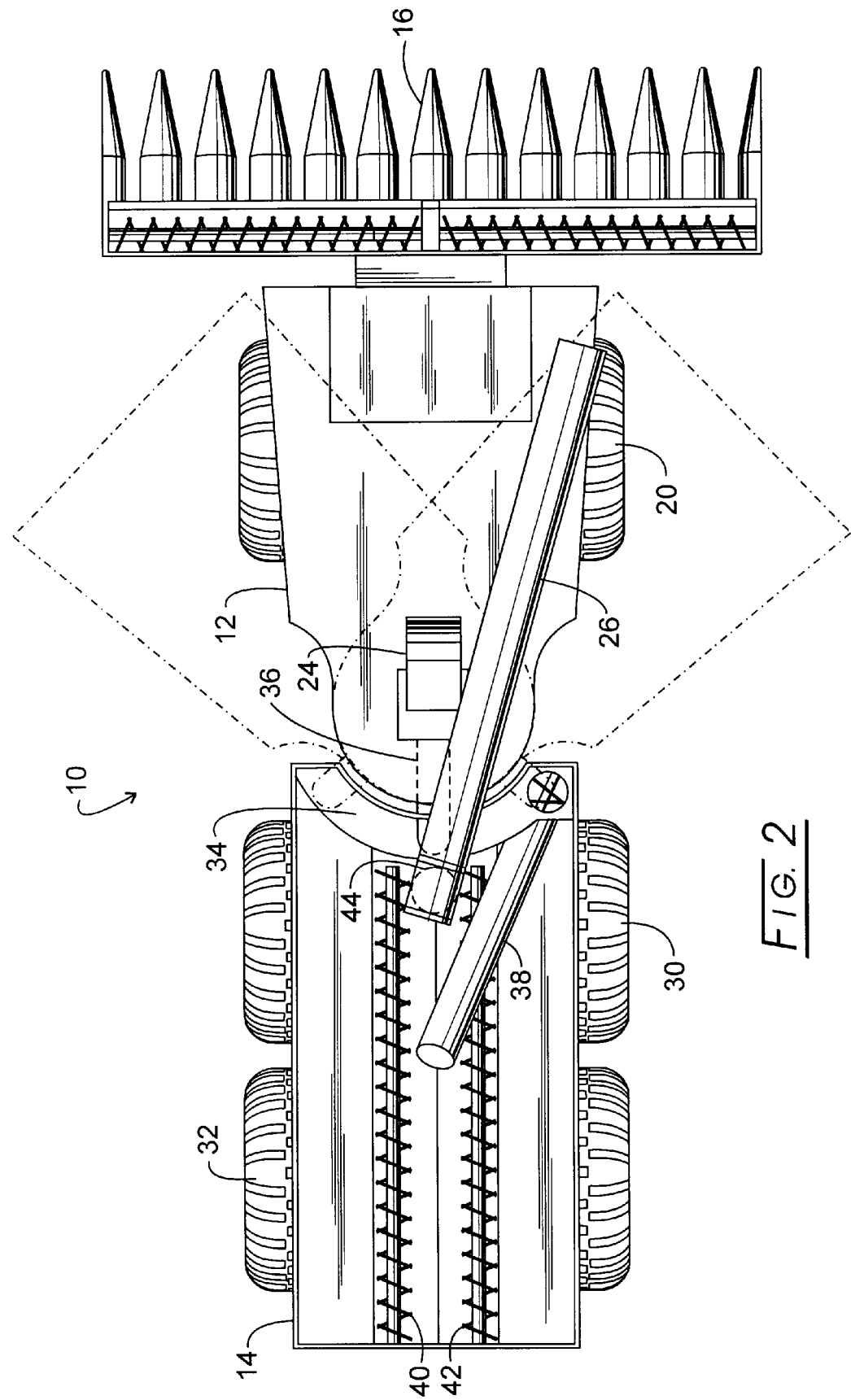
FIG. 2 is an overhead view of the grain trailer depicted in FIG. 1.

Referring initially to FIGS. 1 and 2, innovative combine 10 generally includes forward unit 12 and rearward unit 14. Forward unit 10 is seen to include cab 15 in which the operator is seated, cornhead or small grainhead 16, engine compartment 18 (fan discharge shown in the drawings), and powered non-steerable wheel pair 20. Rearward unit 14 is interconnected to forward unit 12 via joint assembly 22 and clean grain is transferred from forward unit 12 to rearward unit 14 via grain cleaning and transfer assembly 24 seen in the cut-away view. Rearward unit 14 is seen to include clean grain unloading system 26 in its stored position and in phantom in a raised position, grain bin 28, and powered and steerable wheel pairs 30 and 32. Use of a dual axle configuration of powered and steerable wheels supporting grain bin 28 on rearward unit 14 contributes to the capability of grain bin 28 holding upwards to 1,000 bushels of grain or more. Providing the grain bin capacity only on rearward unit 14 translates into a lower center of gravity for grain bin 28 which also enables such higher storage capacity and provides more even weight distribution per axle.

As seen in FIG. 2, clean grain from forward unit 12 is transferred to grain bin 28 via grain transfer assembly 24 which includes a generally horizontal transfer device (e.g., auger, bucket conveyor, cleated conveyor, or the like) which extends into a slot in the side of grain bin 28 which confronts forward unit 12. Note should be made of the arcuate configuration of the rear of forward unit 12 and the front of rearward unit 14 and that these arcuate configurations conform to each other. Moreover, the arc of such configuration is based on the articulation radius of curvature. Such conforming arcuate design permits forward unit 12 to be turned either to the right or to the left, as shown in phantom in FIG. 2.

Slot 34 in the front wall of grain storage bin 28 permits horizontal transfer device 36 to continue to dump grain into bin 28 as forward unit 12 is turned from side to side, also as shown in phantom in FIG. 2. Slot 34 is associated with a "slide" which commences at the top of bin 28 and slants downwardly to meet with hopper fill auger 38 (often called a "bubbler" auger). Such slant ensures that all grain transferred into bin 28 will be directed to the bottom of bubbler auger 38 for distribution of clean grain within bin 28. Transfer device 36, suitably a conveyor could be fixed to forward unit 12 with slot 34 taking up its movement as combine 10 is steered left or right. In this regard, the origination point of transfer device 36 does not need to be located at the centerline of forward unit 12, but can be located to the side of the joint and still feed grain to grain bin 28. Additional flexibility, then, is afforded the combine designer because of the ability to locate the feed end of transfer device 36 to one side of the other of the centerline of forward unit 12.

Alternatively, conveyor 36 could be pivotally mounted to forward unit 12 and slot 34 would not need to be substantially the entire width of grain bin 28 as steering of combine 10 would be taken up by such pivot mounting. In such embodiment, slot 34 need only be an opening through which grain is transferred into bin 28 via transfer device 36. Also, conveyor 36 would need to be located over the joint axis (centerline of forward unit 12) when pivotally mounted to forward unit 12. Conveyor 36 even could be biased to return to a central station once a turn was completed.

Once the clean grain has been transferred into bin 28, it is distributed within grain bin 28 by hopper fill auger 38, which extends from a front corner of bin 28 to around the upper mid-section of bin 28. Grain is unloaded from bin 28 commencing with unload or drag augers 40 and 42 which are located along the bottom of bin 28 and which vertical auger 44 powered by motor 45 (seen in phantom in FIG. 2 and in cross-section in FIG. 7) which suitable also could be a bucket conveyor or other suitable device for transporting grain vertically to clean grain unloading system 26.

Referring to FIG. 7, a cross-sectional view of the grain unloading system of the present invention is shown in detail. Clean grain housed in bin 28 is dragged to vertical auger 28 by augers 40 and 42. Auger 44 could, of course, be replaced by a bucket elevator or other convenient mechanism for vertically transporting clean grain from within bin 28 up the level of unloading system 26. Motor 88, which conveniently is a hydraulic motor, motivates unloading system 26 to rotate about the longitudinal axis of auger assembly 44 in either direction in order to unload the grain into a grain cart, road truck, or other storage location. Unique is the ability to move unloading system 26 to either side of combine 10.

Shroud 90 confines the grain for dumping onto conveyor system 92 which itself is shrouded because the conveyor of conveyor system 92 rotates in the clockwise direction. Again, conveyor system 92 conveniently could be replaced with an auger, a chain with paddles, or other grain moving device. As shown, conveyor system 92 employs upstanding cleats in order to urge the grain along the desired path.

The vertical elevation of unloading system 26 is determined by actuator 94 which can be a rod and piston assembly as shown connecting vertical auger assembly 44 to conveyor system 92. Power again conveniently is supplied by a hydraulic motor; although, other power means may be employed as is necessary, desirable, or convenient in conventional fashion.

In order to be able to unload grain a given distance from combine 10, telescoping conveyor assembly 96, which preferably rotates in the counter-clockwise direction, telescopes from conveyor assembly 92. While a rack and pinion assembly powered by a motor (not shown) is evident in the drawings, a rod and cylinder assembly or other mechanism could provide telescoping movement of conveyor assembly 96. For that matter power, to move the conveyors in conveyor assemblies 92 and 96, hydraulic motors (not shown) preferably are provided. Preferably, conveyor system 96 rotates in the opposite direction of conveyor system 92; although, such opposite direction movement of conveyors 92 and 96 is not necessary for the unique unloading system of the present invention. Ultimately, clean grain exits conveyor assembly 96 via spout 98. With the ability to rotate unloading system 26 to either side of combine 10, to control the vertical elevation of unloading system 26, inching control, and to extend the length of unloading system 26, the novel grain unloading system has the ability and capability to unload grain in trucks parked at a different elevation than is combine 10, parked a variety of distances from combine 10, and parked on either side of combine 10. Depending upon the type of grain conveyance utilized, conveyor assembly 96 could be open or closed at its top.

With respect to operation of clean grain unloading system 26, reference is made to FIGS. 8 and 9 which show a unique joystick control system which controls such unloading system. Initially, joystick 100 is fitted with finger toggle switches 102, 104, 106, and button 108. Toggle switch 102 is activated by the operator's fingers and causes unloading system 26 to move vertically up and down. Switch 104 conveniently is thumb activated and is an on-off switch for unloading system 26. Switch 106 is a combine inching switch, that is, it causes combine 10 to move slowly forward or backward to place spout 98 exactly where the operator desires. Such slow movement is known as "inching" in this field. Button 108 is a "home" button which means that unloading system 26 is returned to its stored position as shown in FIG. 1, for example.

Another capability of joystick 100 is that it can move forward, backward, and laterally left and right. These movements cause unloading system 26 to extend (say, forward movement of joystick 100), retract (backward movement), swing to the left (left movement), and swing to the right (right movement). Finally, joystick 100 is rotatable to control the speed of the conveyors making up unloading system 26.

Joystick 100 accomplishes the described movements of unloading system 26 by signaling electrohydraulic valves with a signal sent to manually adjustable flow control valves for, say, movement of unloading system 26 up/down, left/right, in/out, and home. Joystick 100 signals a proportional servo valve for on/off and conveyor speed (e.g., activates a linear electric servo that moves a pump swash plate). Joystick 100 signals the propulsion system of combine 10 in order to inch the combine forward or reverse by by-passing the normal operator speed control of the vehicle. It should be obvious that the novel combine takes advantage of the hydraulic system already in place in conventional combines and extends their use in order to desirably power the unloading system 26 and wheel pairs 30 and 32. Other power means, of course, could be employed; however, hydraulic power tends to be more reliable.

Figure 10:
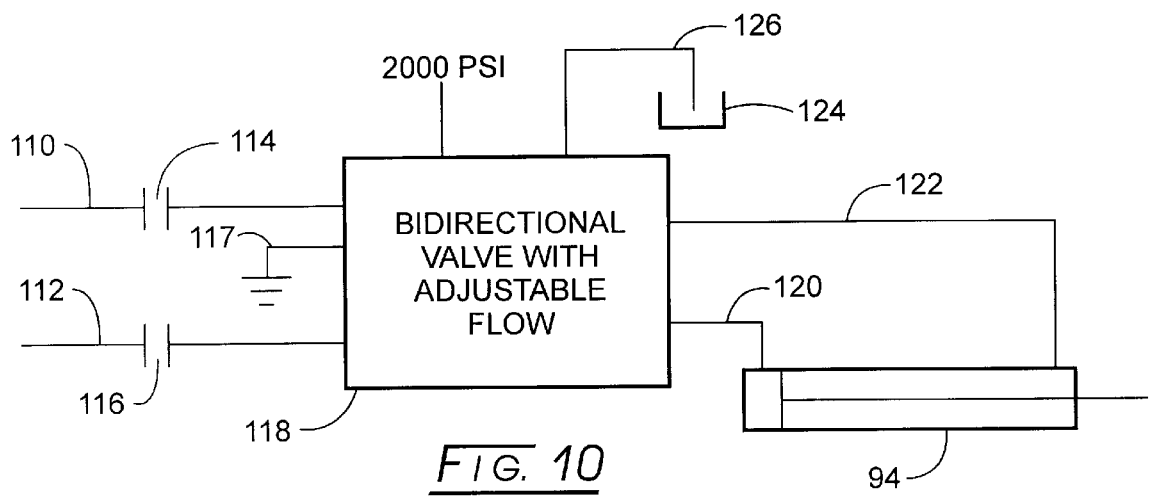
FIG. 10 is a schematic of the hydraulic vertical control for the clean grain transfer assembly of FIG. 7.

Implementation of such joystick movements of unloading system 26 is displayed in FIGS. 10–13. Referring initially to FIG. 10, lines 110 and 112 are connected to a source of voltage (say, 12 volts supplied by the combine). Contacts 114 and 116 are joystick 100 contacts for raising and lowering, respectively, unloading system 26. Ground 117 is provided in conventional fashion. Upon closure of one of joystick contacts 114 or 116, bi-directional valve with adjustable flow 118 is fed hydraulic fluid at, say, 2,000 psi from a hydraulic pump which feeds rod and cylinder assembly 94 via lines 120 and 122 with oil returned to reservoir 124 via line 126. Assembly 94, then, raises and lowers unloading system 26 (conveyor systems 92 and 96).

Figure 11:
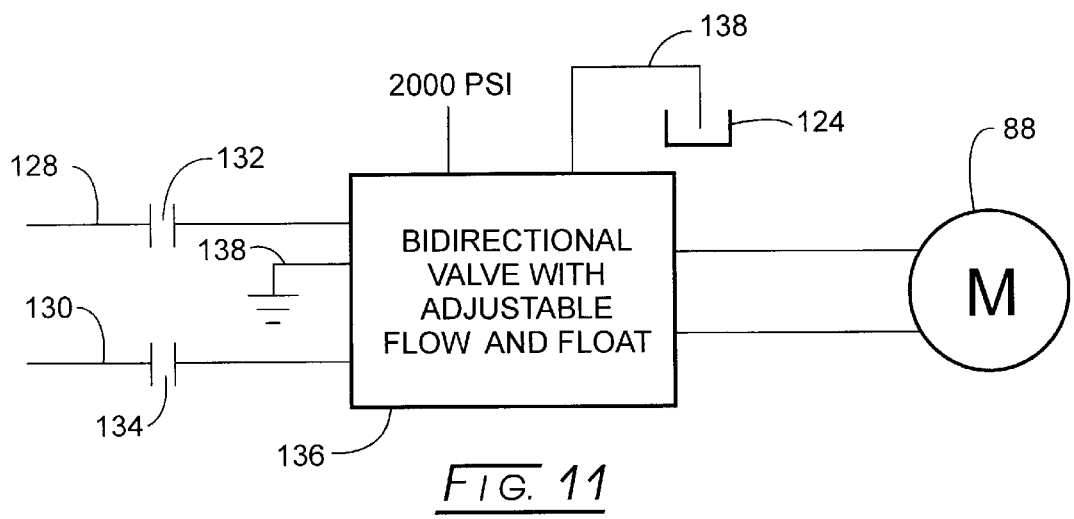
FIG. 11 is a schematic of the hydraulic swing control for the clean grain transfer assembly of FIG. 7.

Referring to FIG. 11, lines 128 and 130 run to joystick contacts 132 and 134 which actuate bidirectional valve with adjustable flow and float 136 which actuates motor 88 for swinging unloading system 26 either left or right. Ground 138 and return line 140 to reservoir 124 are provided in conventional fashion. A rod and cylinder or other means could be substituted for motor 88.

Figure 12:
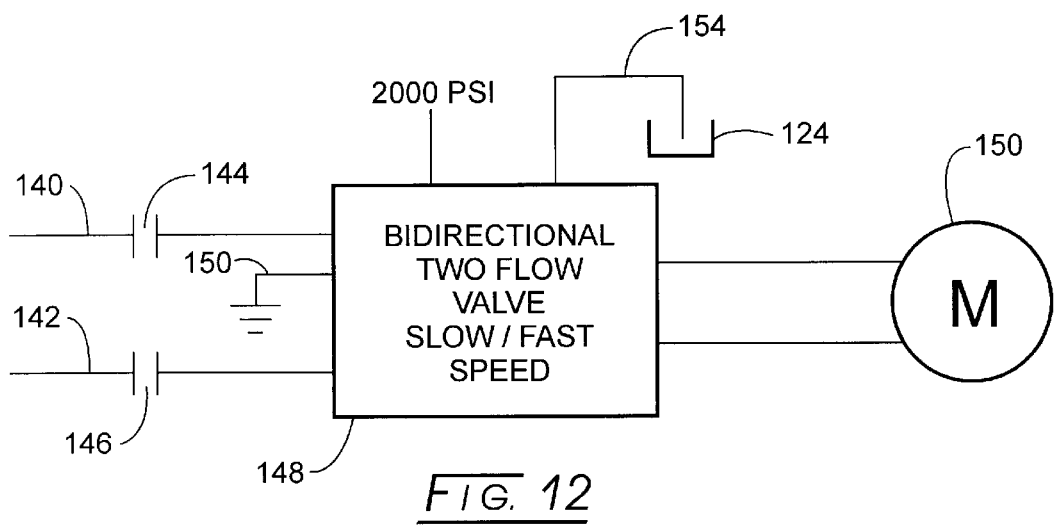
FIG. 12 is a schematic of the hydraulic telescoping control for the clean grain transfer assembly of FIG. 7.

Referring to FIG. 12, lines 140 and 142 run to joystick contacts 144 and 146 which actuate bidirectional two flow valve (slow/fast speed) 148 which actuates motor 150 for extending unloading system 26 in and out (telescopingly extending unloading system 26). Ground 150 and return line 154 to reservoir 124 are conventionally provided. A rod and cylinder or other means could be substituted for motor 150.

Figure 13:
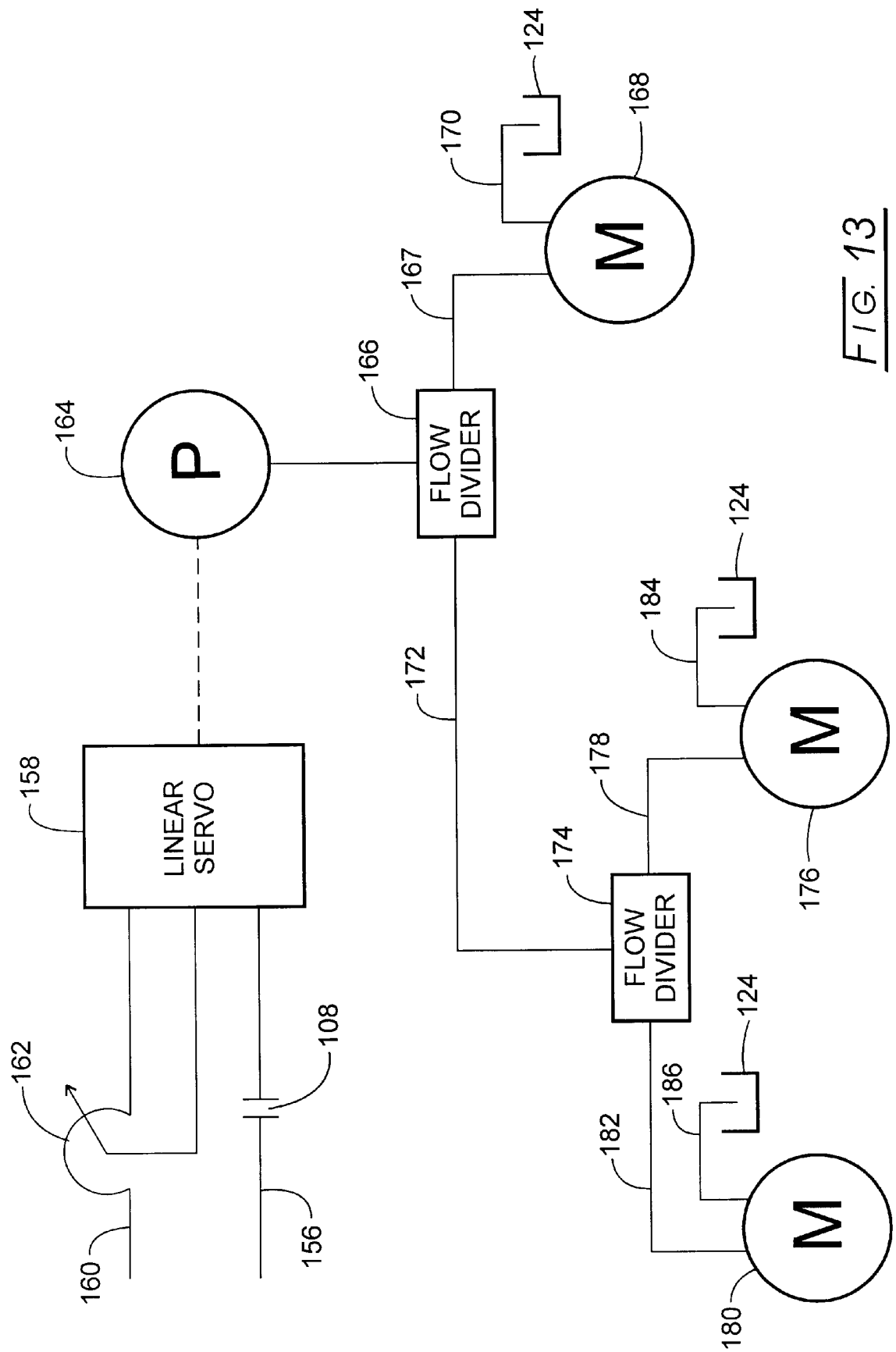
FIG. 13 is a schematic of the hydraulic speed control for the clean grain transfer assembly of FIG. 7.

Referring to FIG. 13, the unload system speed control is shown. Specifically, line 156 has on/off switch 108 which activates linear servo unit 158. Line 160 at, say, 2 volts, runs to joystick 100 potentiometer (actuated by rotation of joystick 100) which in turn runs to linear servo unit 158. Linear servo unit 158 controls variable displacement pump 164 which runs from, say, 0–2,000 psi. In turn, pump 164 pumps oil through flow divider 166 which divides the hydraulic flow to motor 168 via line 167 which runs drag augers 40 and 42 and upstanding auger 44 (the speed of drag augers 40 and 42 needs to be controlled and matched with the speed of auger 44 since these drag augers feed grain to auger 44) with the oil then returning via line 170 to reservoir 124. At this point in the description it should be noted that reservoir 124 is notated on the drawings as the reservoir for all hydraulic fluid circuits. Obviously, additional reservoirs could be used as is necessary, desirable, or convenient.

Next, hydraulic fluid or oil from flow divider 166 flows via line 172 into second flow divider 174 which splits the hydraulic fluid flow between motor 176 via line 178 which motor runs conveyor assembly 92 and motor 180 via line 182 which motor runs outer conveyor assembly 96. Flow divider 174 permits more flow to pass into line 182 than into line 178, say, 55%/45%, in order for outer conveyor assembly 96 to run at a faster rate, say, 10% faster, than conveyor assembly 92 in order to prevent plugging of conveyor assembly 96. Oil from motor 176 returns via line 184 to reservoir 124 while oil from motor 180 returns to reservoir 124 via line 186.

Figure 15:
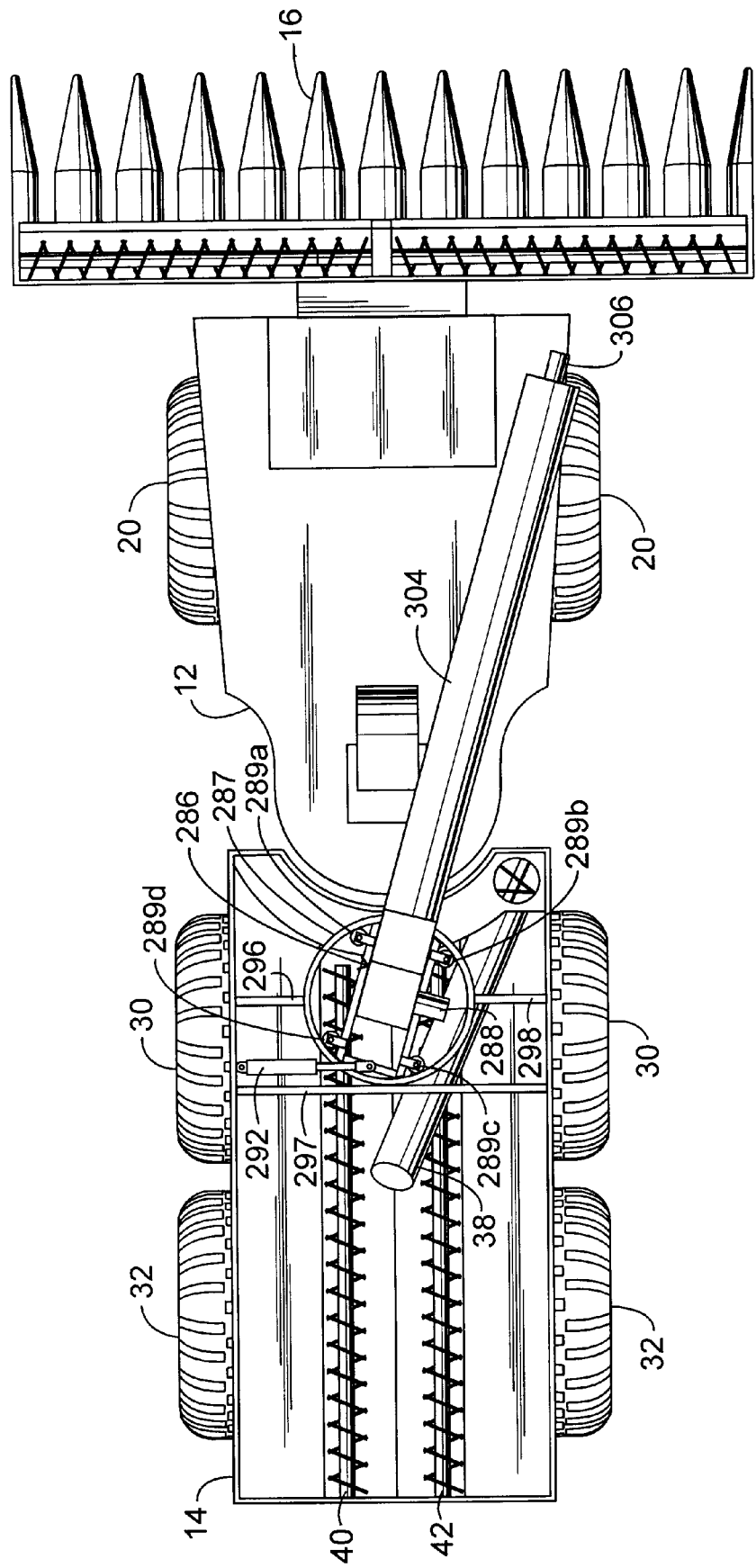
FIG. 15 is overhead view of a the novel combine with an alternative conveyor assembly for feeding grain from the grain bin to the novel clean grain transfer assembly.

An alternative clean grain unloading system is presented in FIGS. 15–17. Specifically, auger 44 has been replaced with bucket conveyor assembly 286 which is powered by hydraulic motor 288 which is located at the top sprocket of assembly 286. Rotation of assembly 286 and raising/lowering of conveyor assembly 26 is accomplished by cylinder assemblies 292 and 294. Channel ring 287 which is held in position by bars 296, 297, and 298. Riding within channel ring 287 are four wheel assemblies 289a–d which are connected to bucket conveyor assembly 286. Thus, as the rod of cylinder assembly 292 extends/retracts, conveyor assembly 286 rotates within channel ring 287.

Cylinder 294 is attached at one end to the channel ring 287 via a wheel and at its other end to conveyor assembly 286. As conveyor assembly 286 rotates (by cylinder assembly 292), conveyor assembly 294 also rotates by dint of its wheeled attachment to channel ring 287. Cylinder 294 causes conveyor assembly 286 to tilt as its rod extends/retracts and such tilting can be accomplished regardless of the rotational position of assembly 286. Because of the moment created when conveyor assembly 286 tilts, it is disposed within circular channel 290 about its lower end. Wheel assemblies 300 and 302 are attached at one end to conveyor assembly 286 with their wheeled opposite ends disposed in the inner channel formed within ring 290. As cylinder 294 causes conveyor assembly 286 to rotate, the wheels of assemblies 300/302 become pivot points for the lower end of assembly 286 to also rotate.

Next, it will observed that inner conveyor assembly has been replaced (compared to the conveyor assembly in FIG. 7) with an auger housed within a shell for conveying grain from bucket conveyor 286 to telescoping cleated conveyor 96. Motor 306 effects rotation of auger 304. Finally, it also is possible to string guy wires from combine 10, say at conveyor assembly 286 (or 44 in FIG. 7) to support conveyor assembly 96, 92, and/or 304, as is necessary, desirable, or convenient. For that matter, other means of supporting the weight of telescoping assembly 26 may be designed and implemented depending upon needs. For example, conveyor assembly 96 may be made of aluminum in order to reduce its weight.

Regarding to the novel two-axis joint of the present invention, unique to joint 22 is that it is a "single point" joint. That is, joint 22 is designed to be only about a foot or so high. No other structural connection between forward unit 12 and rearward unit 14 is required by dint of the design of joint 22. That is not to say that other structural connection cannot be made between forward unit 12 and rearward unit 14, but that such other structural connection is unnecessary. In fact, it is a positive advantage that no other structural interconnection is needed between the two units because the combine designer has greater flexibility in locating equipment, lines, feeders, etc. because of the single point joint design disclosed herein.

Referring to FIGS. 3 and 4 which illustrate joint 22, initially, however, it will be observed that a pair of steering cylinders, 46 and 48, are seen in FIG. 2 to connect forward unit 12 to rearward unit 14 of articulated combine 10. Such steering cylinders are conventionally used to assist in the steering of articulated vehicles and are provided here for such steering use in the present articulated combine design. Now, with respect to the two-axis joint, pipe 50 is attached to rearward unit 14 at one end and is constructed as a round pipe or structural tube because it is in the chaff/straw flow path from grain cleaning and transfer assembly 24. Shaft 52 extends from pipe 50 towards forward unit 12 and is inserted into bearing retainer assembly 60 which is inserted between upper frame member 54 and lower frame member 56. These frame members 54 and 56 are bolted to forward unit 12 via bolts 58a–d, although other attachment means certainly can be envisioned. Each frame member 54 and 56 has an inner recess which confront each other and into which is inserted bearing retainer assembly 60.

Bearing retainer assembly 60 has a pair of nibs or ears which fit into frame member 54 and 56 recesses and which ride on tapered roller bearings 62a–62d to provide sideways movement to units 12 and 14 via shaft 50. Such sideways movement permits combine 10 to be steered. A hole penetrates through bearing retainer assembly 60 into which a tapered threaded end of shaft 52 fits and is secured via nut 64. Now, thrust bearings 66 and 68 fit into recesses which adjoin the hole through bearing retainer assembly 60 and which thrust bearings permit shaft 52 to rotate and which, thus, enable units 12 and 14 to rotate with respect to each other. Such rotation permits units 12 and 14 to traverse uneven terrain during harvesting or other movement of combine 10. Note, however, that pipe 50 and shaft 52 are not permitted to move in a vertical direction due to the unique construction of joint assembly 22. Thus, a unique dual axis joint has been disclosed.

Figure 5:
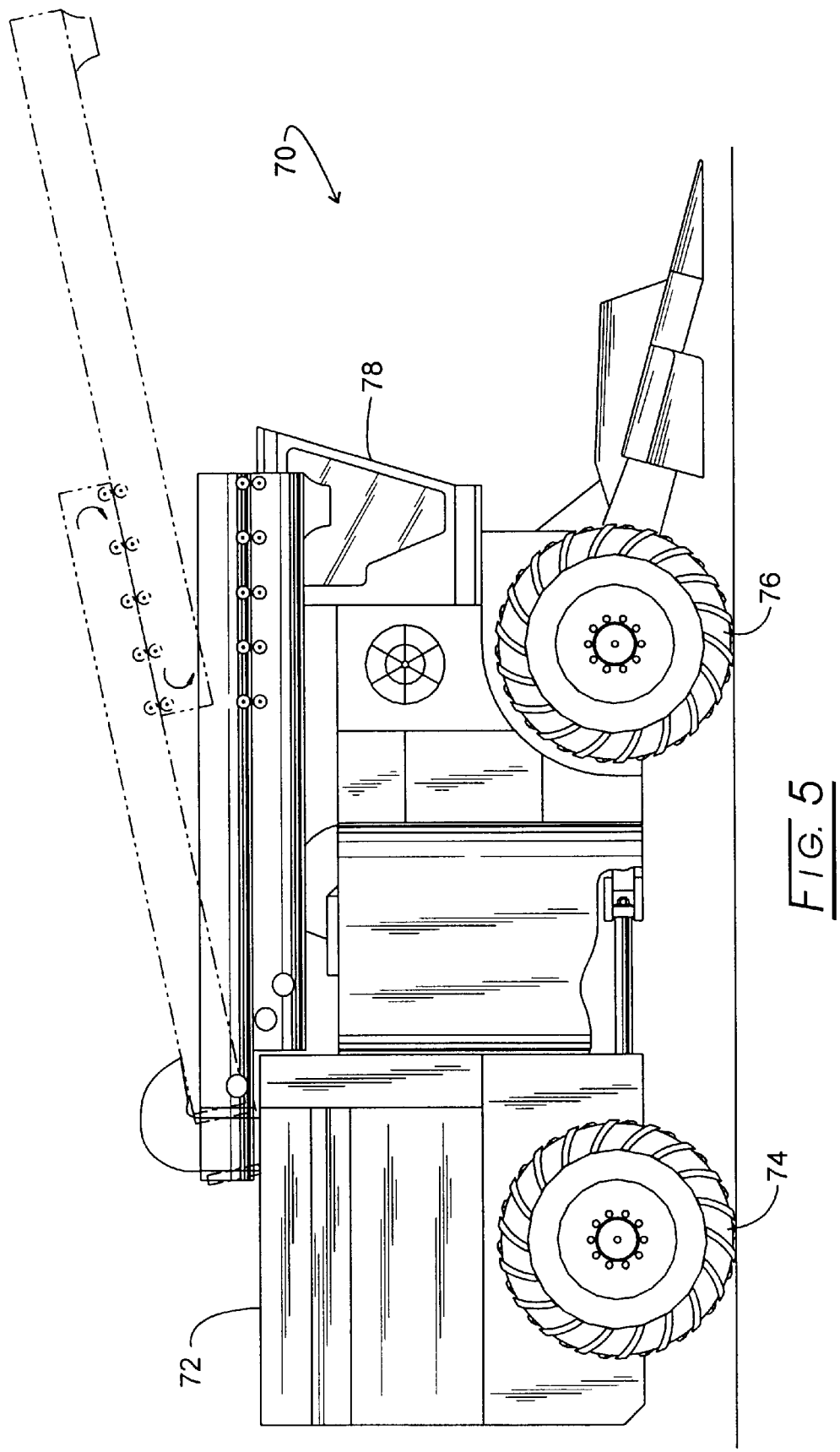
FIG. 5 is a single axle rear unit version of the combine depicted in FIG. 1.

Harvester 70 shown in FIG. 5 is a 500 bushel version of the novel articulated harvester because it has a single axle for rearward unit 72. Wheel pair 74 again is powered and optionally steerable (all wheel pairs may be designed to be oscillating with a walking beam or non-oscillating as is necessary, desirable, or convenient in conventional fashion) while wheel pair 76 for forward unit 78 is powered and non-steerable. Steering may be accomplished only by steering cylinders 46 and 48 in this combine embodiment. The operation of the joint axis, grain bin, and unload conveyor system remains the same for this embodiment of the present invention.

Figure 6:
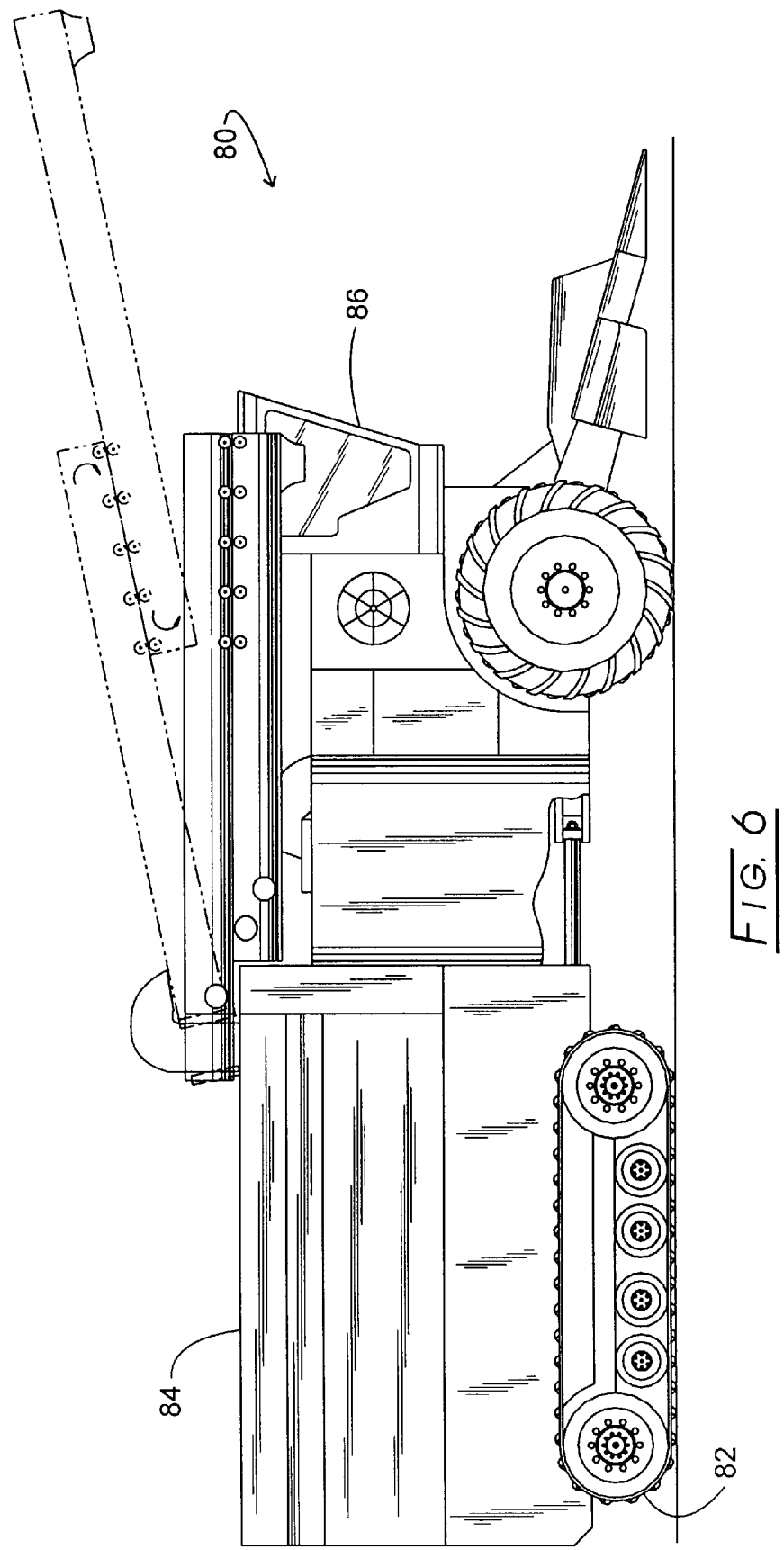
FIG. 6 is a truck driven rear unit version of the combine depicted in FIG. 1.

FIG. 6 shows yet another embodiment of the present invention where combine 80 is provided track driving system 82 for rearward unit 84. Forward unit 86 remains the same as described with respect to combines 10 and 70. A unique steering system for track driven combine 80 is disclosed in applicant's application Ser No. 09/210,331, filed Dec. 11, 1998 (attorneys docket no. DIL 2-003).

Figure 14:
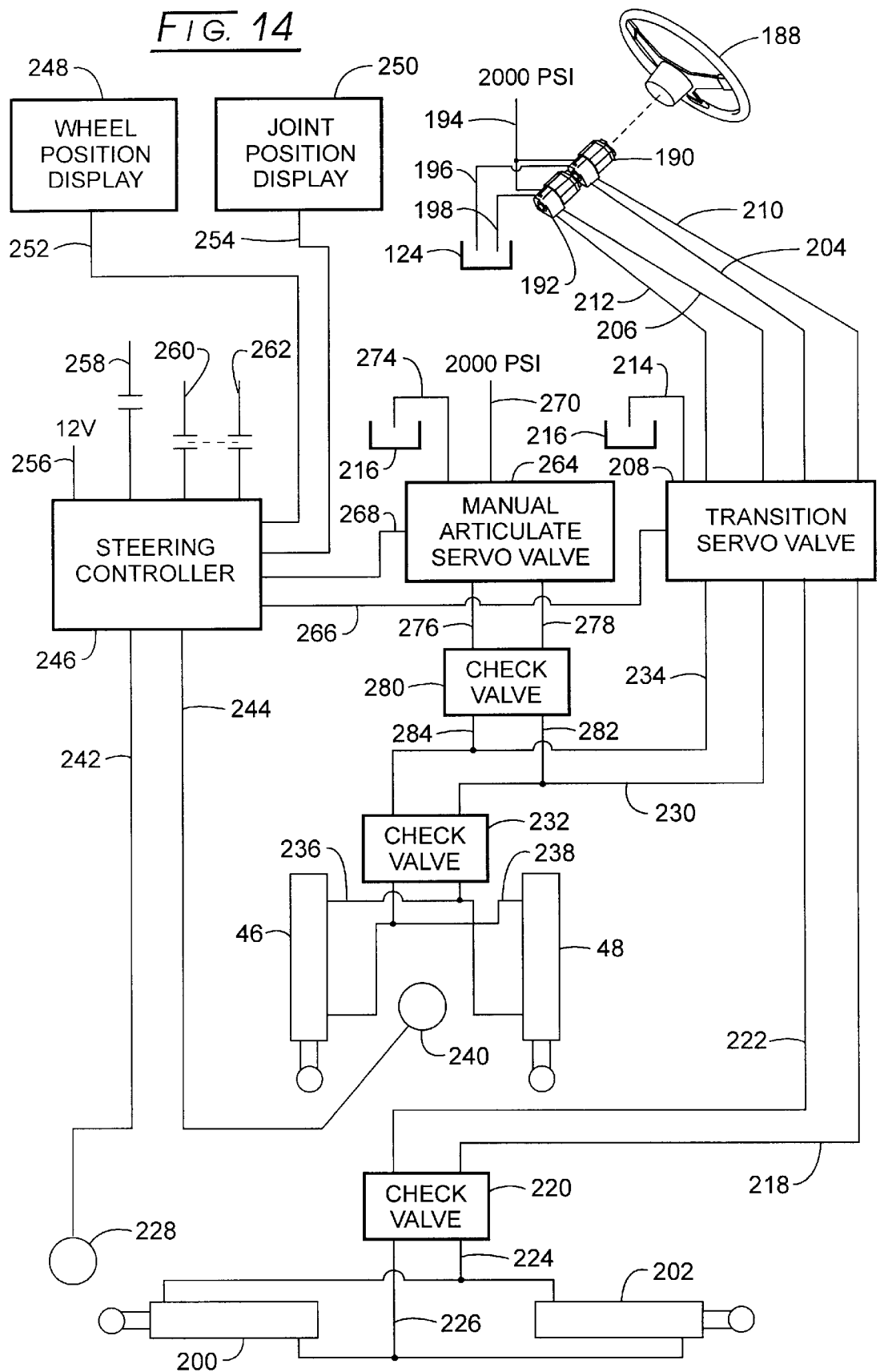
FIG. 14 is a schematic of the hydraulic steering system for the novel articulated combine.

Steering the novel articulated combine, both in the field and on roadways, presents some unique problems because of the articulation joint connecting forward unit 12 and rearward unit 14. One steering system for accomplishing this task is set forth in FIG. 14. The combine operator in cab 15 steers combine 10 via steering wheel 188 which is connected to valves 190 and 192, which optionally could be replaced with a single multi-port valve. Valves 190 and 192 are fed hydraulic fluid via line 194 at, say, 2,000 psi and are also connected to reservoir 124 via lines 196 and 198, respectively. Since steering is accomplished by both articulation steering cylinders 46 and 48, and by a pair of steering cylinders, 200 and 202 attached to wheel pair 30 and by an additional pair of steering cylinders associated with wheel pair 32 (not shown in the drawings). Since steering is initiated by wheel pairs 30/32 first turning, hydraulic fluid from valves 190/192 flow via lines 204 and 206 to transition servo valve 208 which also is fitted with oil return lines 210 and 212 to valves 190/192, respectively and line 214 which runs to tank 216 (as stated above, hydraulic fluid or oil tanks 124 and 216 may be the same or different tanks).

Transition servo valve 208 operates by first passing hydraulic fluid through line 218 to check valve 220 which also has return line 222 to transition servo valve 208. Check valve 220 is associated with steering cylinders 200/202 via distributor line 224. Cylinders 200/202 have return distributor line 226 to check valve 220. Check valve 220 holds the pressure on cylinders 200/202 in order that inadvertent bumps and other obstacles do not cause wheel pair 30 (or 32) to deviate from their set course unexpectedly. Now, it is anticipated that wheel pairs 30/32 will only need to turn a slight bit, say 10° to 20°. When wheel position sensor 228 senses that maximum travel of cylinders 200/202 is approaching, oil in transition servo valve 208 commences to be diverted slowly into line 230 which runs to check valve 232 which also is fitted with return line 234. Once full stroke of cylinders 200/202 is reached, all of the hydraulic fluid is shunted to line 230 and check valve 220 holds cylinders 200/202 in position.

Check valve 232 is associated with steering cylinders 46/48 via distributor line 236 and return distributor line 238. Steering cylinders 46/48 now articulate combine 10 to effect full turning of it. When the turn is completed, the system works in reverse, that is steering cylinders 48/48 and returned to their home position first followed by wheel cylinders 200/202. The flow through transition servo valve 208 as described is intended to make the turning transition between cylinders 200/202 and 46/48 as smooth as possible.

Now, operator knows the precise position of wheel pairs 30/32 by means of sensor 228 and of articulation steering cylinders 46/48 (and hence the relative position of forward unit 12 and rearward unit 14 about joint assembly 22) by means of sensor 240. Sensors 228/240 are connected, respectively, by lines 242 and 244 to steering controller 246 which publishes their respective positions to the operator via displays 248 and 250 which are connected to controller 246 by lines 252 and 254, respectively. Controller 246 is connected by line 256 to a source of power (say, the 12 v battery of combine 10) and is actuated by switch 258 which determines whether a manual or automatic articulating mode is established, switches 260 and 262 which are left/right rocker switches. These switches also are located in cab 15 for the operator's use. In turn controller 246 actuates transition servo valve 208 and manual articulate valve 264 by lines 266 and 268, respectively.

Manual articulate servo valve 264 is energized by line 270 which is connected to, say, 2,000 psi hydraulic fluid with line 274 returning the fluid to reservoir 216. Manual articulate servo valve 264 is connected by lines 276 and 278 to check valve 280 which in turn is connected by lines 282 and 284 to check valve 232. Manual articulate servo valve 264 permits the combine operator to manually cause operation of articulation steering cylinders 46/48 as an override to steering controllers 246 and transition servo valve 208. Thus, the operator can permit the compound steering system to operate fully automatically or the operator can override such system and manually articulate combine 10 while steering wheel 188 controls steering wheel pairs 30/32. This gives the operator the maximum flexibility in steering combine 10 in expected as well as unexpected conditions.

It will be appreciated that the foregoing description is illustrative of how the present invention can be practiced, but it should not be construed as limiting the present invention. Finally, all citations referred to herein are expressly incorporated herein by reference.

What is claimed is:

1. An improved articulated combine of a forward unit and rearward unit which are connected by a joint and which combine has a radius of articulation about said joint, said rearward unit having an onboard grain bin, the improvement for transferring clean grain from said forward unit to said rearward unit which comprises:

(a) said rearward unit having a front and said forward unit having a back, both of which conform in shape to each other and both of which are curved to match the radius of articulation of the combine, said rearward unit forward having a horizontal slot in it; and (b) a grain transfer assembly having an elongate discharge end which fits into said rearward unit forward horizontal slot for providing grain transfer capability to said onboard rearward unit grain bin while said forward and rearward units are being turned about said joint.

2. The combine of claim 1, wherein said slot is fitted with a downward sloping slide along said rearward unit front commencing at the slot at one side of said grain bin to the grain bin bottom at the other side of said grain bin.

3. The combine of claim 1, wherein said grain transfer assembly includes a grain conveyor which fits into said horizontal slot.

4. The combine of claim 3, wherein said grain conveyor is pivotally attached to said forward unit at the centerline of said forward unit.

5. The combine of claim 3, wherein said grain conveyor is attached to said forward unit at a location which is not at the centerline of said forward unit.

* * * * *